United States Patent [19]
Silverbrook et al.

[11] Patent Number: 5,845,010
[45] Date of Patent: *Dec. 1, 1998

[54] COMPRESSION ENHANCEMENT IN GRAPHICS SYSTEM

[75] Inventors: Kia Silverbrook, Woollahra; James Robert Metcalfe, Collaroy Plateau, both of Australia

[73] Assignees: Canon Kabushiki Kaisha, Tokyo, Japan; Canon Information Systems Research Australia Pty. Ltd, New South Wales, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 451,909

[22] Filed: May 26, 1995

Related U.S. Application Data

[63] Continuation of Ser. No. 889,194, May 28, 1992, abandoned.

[30] Foreign Application Priority Data

May 30, 1991 [AU] Australia .................................. PK6391

[51] Int. Cl.$^6$ ................................. G06K 9/36; G06K 9/34
[52] U.S. Cl. .......................... 382/232; 382/166; 382/167; 382/176
[58] Field of Search ..................................... 382/166, 260, 382/239, 275, 176, 232, 233, 167; 358/429, 430, 431, 432, 433, 447, 462, 463

[56] References Cited

U.S. PATENT DOCUMENTS

| | | | |
|---|---|---|---|
| 4,486,785 | 12/1984 | Lasher et al. | 358/447 |
| 4,807,298 | 2/1989 | Conte et al. | 382/253 |
| 4,941,043 | 7/1990 | Jass | 358/133 |
| 4,969,204 | 11/1990 | Melnychuck et al. | 382/56 |
| 5,079,630 | 1/1992 | Golin et al. | 348/399 |
| 5,109,451 | 4/1992 | Aono et al. | 382/166 |
| 5,204,756 | 4/1993 | Chevion et al. | 358/462 |
| 5,247,589 | 9/1993 | Faul et al. | 382/166 |
| 5,333,212 | 7/1994 | Ligtenberg | 382/264 |
| 5,353,132 | 10/1994 | Katsuma | 382/166 |

FOREIGN PATENT DOCUMENTS

| | | | |
|---|---|---|---|
| 194689 | 9/1986 | European Pat. Off. | G06F 15/68 |
| 346766 | 12/1989 | European Pat. Off. | H04N 7/133 |
| 370718 | 5/1990 | European Pat. Off. | H04N 1/41 |

OTHER PUBLICATIONS

Patent Abstracts of Japan, vol. 14, No. 162 (KOKAI 2–019821), Jan. 1990.

*Primary Examiner*—Jose L. Couso
*Assistant Examiner*—Matthew C. Bella
*Attorney, Agent, or Firm*—Fitzpatrick, Cella, Harper & Scinto

[57] ABSTRACT

Disclosed is an arrangement which lessens the effects of compression artifacts resulting from the compression of graphic images having high spatial frequency components. Such graphic images are typically text related in view of the high contrast required for text outlines. The arrangement includes a text detector configured to detect cells of a source image which are likely to create compression artifacts when each of the cells is compressed by a compressor for storage in a compressed image store. The text detector creates a bit table in a text detect store of those cells which include high spatial frequency components. Upon expansion, of the compressed image by an expander, the cells are passed through a pixel saturator which, if the cell is a "text" cell referenced in the text detect store, all pixels within that text cell are saturated to colours from a predetermined set of colours. The expanded image is then restored to an image store.

54 Claims, 10 Drawing Sheets

COMPRESSION ENHANCEMENT IN GRAPHICS SYSTEM

This application is a continuation of application Ser. No. 07/889,194 filed May 28, 1992, now abandoned.

BACKGROUND OF THE INVENTION

1. Field of the Invention

The present invention relates to graphics systems and, in particular, to graphics systems which include a means for storing images in compressed form.

2. Description of the Related Art

Because of the cost of dynamic random access memory (DRAM), it has become desirable to reduce the cost of graphics systems by replacing a full image frame store formed out of DRAM and substituting an arrangement by which, as the graphic image is generated, portions of the image are sequentially compressed, and the image stored in a compressed form. Where small images are being used, this arrangement is not cost effective, however, where large images are used such as an A3 page image at an image density of 400 dots per inch (dpi), the expense of a full frame store of DRAM required to store approximately 100 MBytes is substantially more expensive that the compression alternative.

One example of an image compression system is that promulgated by the Joint Photographics Experts Group (JPEG). The JPEG process is very effective for the compression of full colour images and a compression ratio of 25 to 1 can be readily achieved. In this manner, a full colour A3 size image at a density of 400 dpi can be stored in approximately 4 MBytes of RAM.

However, when the JPEG process is applied to computer generated text and other graphic objects, (hereinafter referred to as "text"), where there is a predominance of high spatial frequencies or areas of saturated or near saturated (hereinafter referred to as "saturated") colours, the JPEG compression process introduces excessive distortions.

The JPEG process was developed for the compression of continuous tone images and operates at a high degree of accuracy for images which comprise relatively gradual changes of colour. However, computer generated coloured "text" contains spatial frequency components well above the Nyquist frequency of the sampling grid. When transformed into the frequency domain by the Discrete Cosine Transform (DCT) of the JPEG standard, frequencies above the Nyquist limit "reflect" around the Nyquist frequency, are added to the valid frequency components, and become inseparable from them. This phenomena is commonly called "aliasing". When the image is subsequently reconstructed with an Inverse Discrete Cosine Transform (IDCT), this aliasing is manifested as various changes in intensity over each JPEG cell, (8×8 pixels) which includes a frequency above the Nyquist limit. This can result in compression artifacts such as "speckles". As the energy above the Nyquist frequency is usually small, for moderate compression ratios, the difference in intensity in any pixel of the "text" or its surroundings from the original image is unlikely to exceed 50% of the full-scale value.

One means by which the foregoing problems can be overcome is to treat "text" objects separately from the remainder of the image, whereby the remainder of the image undergoes JPEG processing, whilst the "text" is stored in an alternate manner that does not introduce distortions. Such a configuration is generally not useful because, once the full image has been formed, it is desirable to treat the image as a whole so that various global graphic operations can be achieved.

SUMMARY OF THE INVENTION

Accordingly, it is an object of the present invention to substantially overcome, or ameliorate, the abovementioned difficulties with compression through provision of a method by which "text" can be stored in compressed form, whilst any restored, uncompressed image, is substantially free of distortions.

In accordance with one aspect of the present invention there is disclosed a method of removing compression artifacts in graphics systems, said method comprising the steps of:

(a) examining all regions of an image to identify those regions at which compression artifacts are likely to be produced, deeming those regions as selected regions, and maintaining a record thereof;

(b) compressing the image, including the selected regions, to thereby produce compression artifacts, and subsequently expanding the image; and (c) using said record, manipulating the expanded selected regions to reduce the visual impact of said produced artifacts.

In accordance with another aspect of the present invention there is disclosed a compression enhancement arrangement for graphics systems, said arrangement comprising:

detecting means for detecting those regions of an image in which compression artifacts are likely to be produced and deeming same as selected regions;

storage means for maintaining a record of said selected regions; and restoring means for, after compression and subsequent expansion of said image, manipulating said selected regions based on said record to reduce the visual impact of any produced artifacts.

Further objects, features and advantages of the present invention will become apparent from the following detailed description of embodiments of the present invention with reference to the accompanying drawings.

DESCRIPTION OF THE PREFERRED EMBODIMENTS

Figure 1:
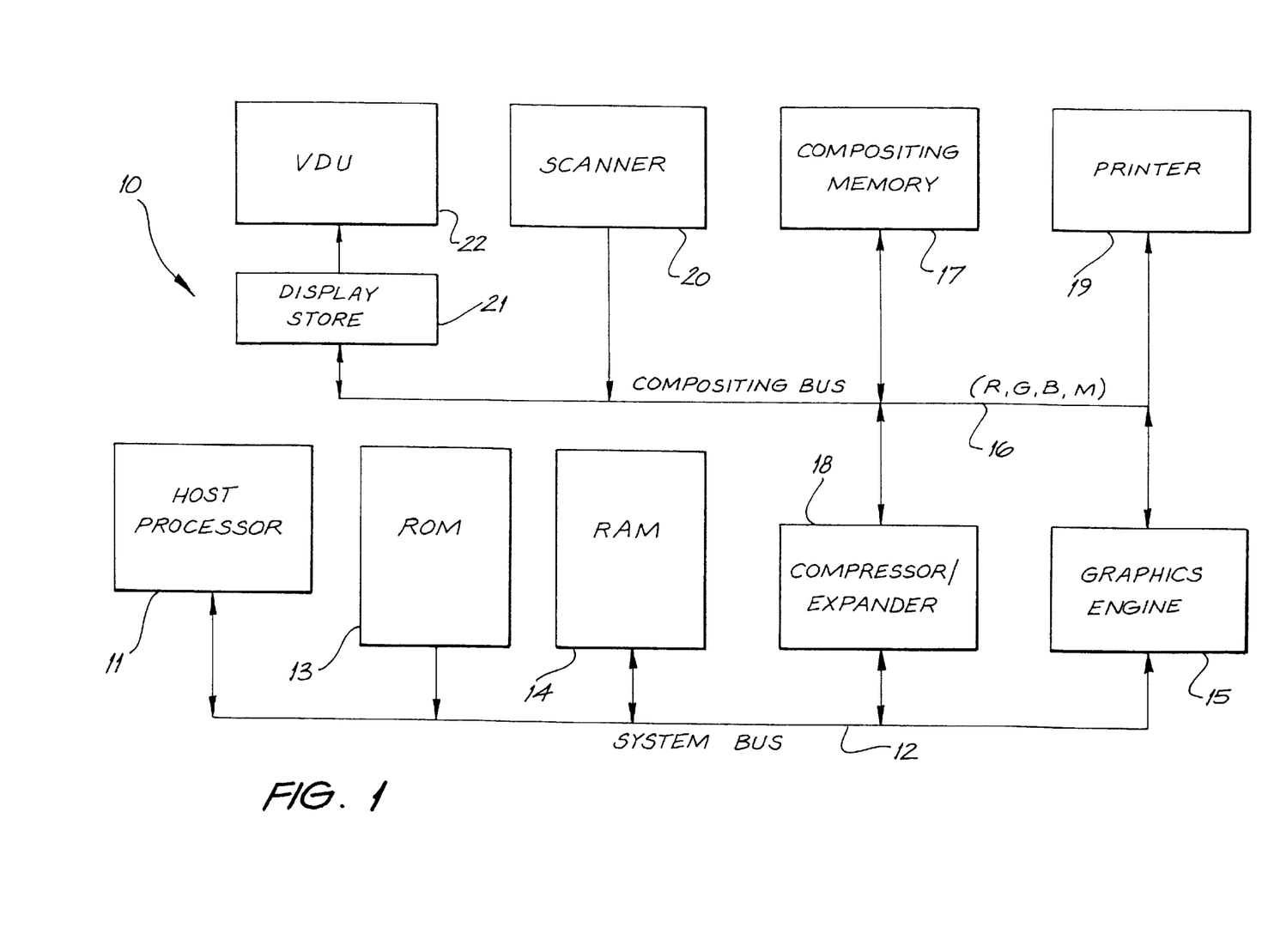
FIG. 1 is a schematic block diagram representation of a graphics system which utilises a compressed image store.

Referring to FIG. 1, a graphics system 10 is shown which is configured for the storage of compressed images.

The system 10 comprises a host processor 11 which connects via a system bus 12 to a ROM 13, a RAM 14, and a graphics engine 15. One purpose of the ROM 13 is to store graphic objects which are used in image creation whilst the RAM 14 is used to create a display list of objects for each particular image. Under the control of the host processor 11, the objects in the display list are input to the graphics engine 15 which renders the image on a line by line basis. As the lines of the image are rendered, they are output onto a compositing bus 16 and temporarily stored in a compositing memory 17 having sufficient capacity to store a limited number of lines of the full image.

Once the compositing memory 17 is full, the graphics engine 15 is temporarily halted and the contents of the compositing memory 17 are compressed by a compressor/expander unit 18 with the compressed image data being stored in the RAM 14 via the system bus 12. The graphics engine 15 can then recommence image rendering for the next set of lines of the image.

Once the entire image has been stored in compressed form in the RAM 14, it can be expanded for either display on a printer 19 or, on a video display unit (VDU) 22. In each case, a predetermined number of lines of the image are expanded by the compressor/expander 18 into the compositing memory 17 from where they are passed to either the printer 19, or the VDU 22 via a display store 21.

Also seen in FIG. 1 is a scanner 20 which can be used to scan full colour images and from where image data is stored in the compositing memory 17 prior to compression and storage as a compressed image in the RAM 14. The compositing bus 16 is generally 32 bits wide, having 8 bits of each of red, green, blue and matte (RGBM). Preferably the compressor/expander 18 operates in accordance with the JPEG standard.

Figure 12:
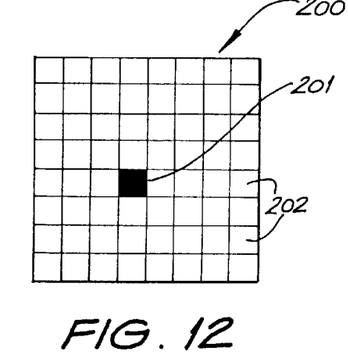
FIG. 12 illustrates a JPEG cell having a high frequency pixel transition.
Figure 13:
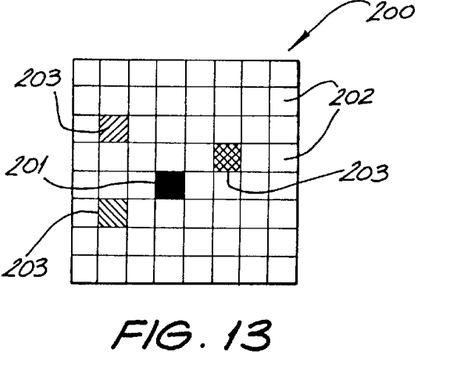
FIG. 13 is a view of the cell of FIG. 12 after compression and subsequent expansion and showing introduced distortions.

Turning now to FIGS. 12 and 13, FIG. 12 shows a standard 8×8 pixel JPEG cell 200 which includes a single black pixel 201 with the remaining pixels being white pixels 202. The cell 200 appears as it will have been generated for example by the graphics engine 15 and temporarily stored in the compositing memory 17. The JPEG standard operates on cells of 8×8 pixels and the mathematical processing of each pixel's value within each cell is dependent upon the accumulated energy within the cell which, in turn, is dependent upon the manner in which colour changes throughout the cell. In the cell 200, the existence of the black pixel 201 amongst all the other white pixels 202, represents a high frequency change in colour in excess of the Nyquist frequency. Accordingly, when the cell 200 is compressed, the JPEG process will produce distortions which, upon subsequent expansion, can result in the cell 200 being shown as illustrated in FIG. 13 where reflection of the black pixel 201 results in various grey pixels 203.

Figure 14:
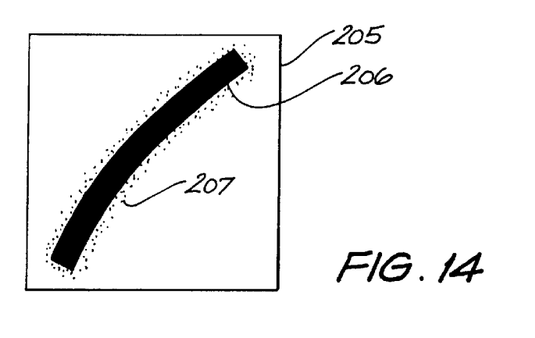
FIG. 14 is a representation of how the distortions appear on a single image.

This aliasing phenomena occurs where there is a sharp transition between colours having a high level of contrast. Such is typical of the case with standard text which is generally printed as black on white paper. As seen in FIG. 14, an image 205 is shown which includes a black stripe 206, typical of part of a text character which, when restored from a compressed image store, results in the production of speckles 207 which surround the edge of the stripe 206. The speckles 207 result from grey pixels being printed as a result of aliasing effects such as those illustrated in FIG. 13. In addition, although not illustrated in FIG. 14 for clarity, white speckles are also produced which are evidenced within the strip 206 near the edges, and thereby substantially adjacent the black speckles 207.

One embodiment of the present invention, by which compression induced distortions are ameliorated, is to pre-process the "text" to reduce its high frequency content. The pre-processing uses a scheme called "antialiasing" whereby the "text" is antialiased prior to compression. In this strategy, the text is "filtered" prior to compression. The "filtering" is carried out during the outline-to-pixel conversion process (rendering). In a normal (aliased) rendering process, a pixel in the bit map is set to one fixed level only if the text outline encompasses that pixel by more than 50%. In an antialiased rendering process, the colour level of a pixel is set to a value representing the percentage by which the text outline encompasses the pixel.

Another embodiment of the present invention, to ameliorate compression distortion artifacts is to post-process the "text" to remove the aliased frequency data. The post-processing approach assumes the original text characters were "saturated", and that the original pixels have been changed in intensity during the compression process by no more than 50%. Therefore, the original pixels can be restored by re-saturating them.

The preferred embodiment proposes a combination of both pre-processing and post-processing approaches.

Figure 2:
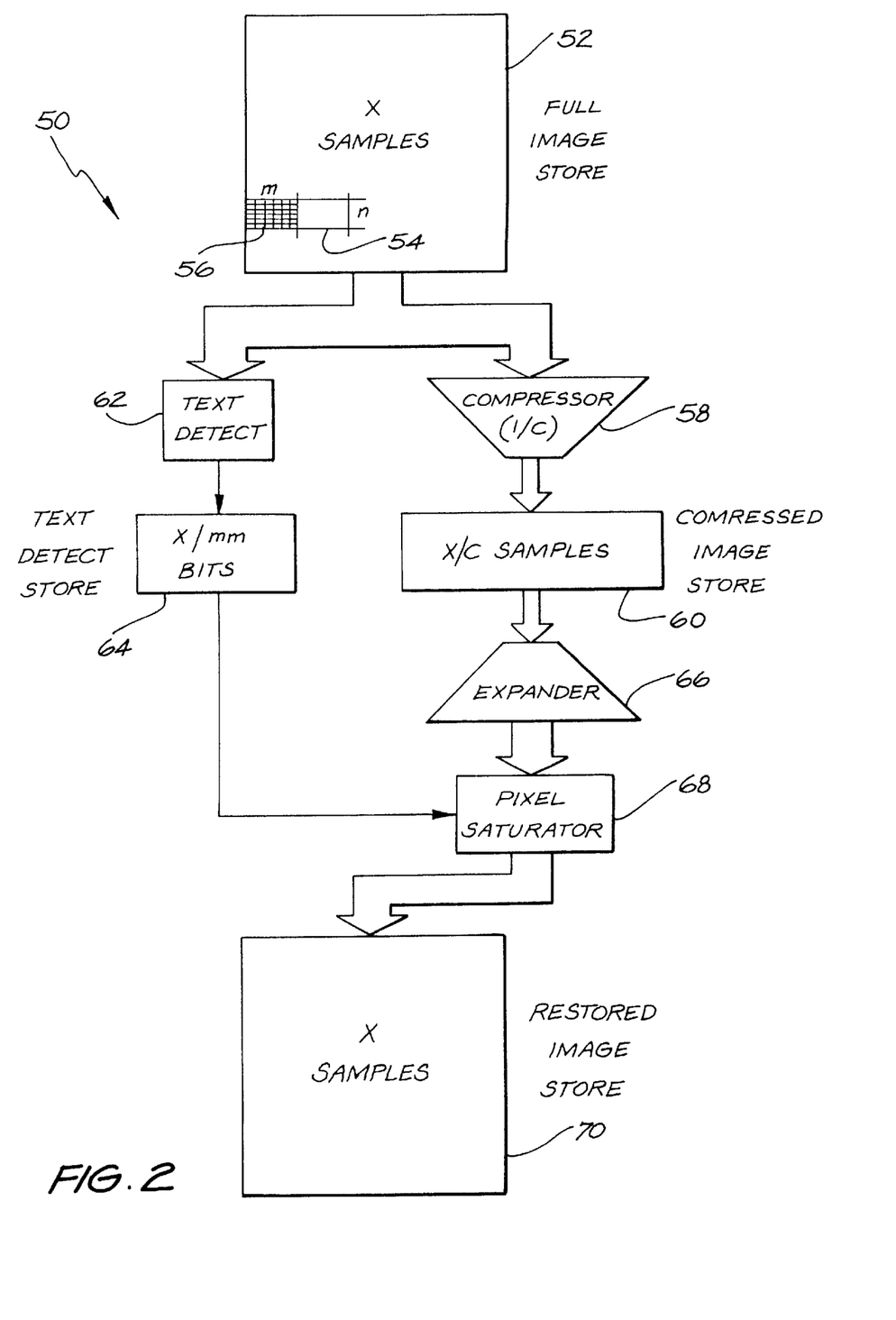
FIG. 2 is a schematic block diagram representation of one embodiment of the present invention.

Turning now to FIG. 2, a compression enhancement system 50 is shown which includes a full image store 52 having X samples. The image store 52 is divided into a plurality of cells 54 each of which having M×N (M,N greater than or equal to 1) individual pixels (samples) 56. Prior to compressing the samples in the image store 52, the "text" areas of the image are identified on a cell by cell basis.

When image compression is required, the image is output to a compressor 58 having a compression ratio 1/C which outputs to a compressed image store 60 having the equivalent of X/C samples.

Simultaneously with the outputting of the image samples to the compressor 58, the samples are each passed to a text detect unit 62 which identified various cells 54 as "text" cells. The text detect unit 62 outputs to a text detect store 54 which acts as a map of the locations of the "text" cells. The text detect store 64 will comprise X/MN bits and also forms part of the compressed image.

When recovery of the image is required, the samples in the compressed image store 60 are output to an expander 66 complementing the operation of the compressor 58 and outputting to a pixel saturator 68. Any non-text cells are expanded in the usual manner whereas "text" cells, as identified by the map in the text detect store 64, are processed within the pixel saturator 68 to remove most, if not all, of the compression artifacts introduced into the image data. The pixel saturator 68 which resets pixels within particular cells to predetermined colours. The restored image is output from the pixel saturator 68 to a restored image store 70 having X samples.

It will apparent when applying the configuration of FIG. 2 to the graphics system 10 of FIG. 1, that the image stores 52 and 70 can be implemented by the compositing memory 17 and that the compressor 58 and expander 66 are implemented by the compressor/expander 18 such as a JPEG device. Both the text detect store 64 and the compressed image store 60 can be formed within the RAM 14.

Text detection can be performed in a number of ways. The preferred method for implementing text detection is that each pixel in each cell is tested for "saturation" where saturation refers to the pixel being within a defined percentage of full colour saturation.

A number of different criteria can be used to decide whether a cell is deemed to be a "text" cell. Several different criteria can be used such as follows:

Criteria 1—a cell is a "text" cell if every pixel in the cell is "saturated" to any one of a defined set of colours (e.g. "saturated" black or white). In this case, the 8 bit data for each pixel will be either FF, or 00.

Criteria 2—a cell is a "text" cell if each pixel in the cell is "saturated" as in criteria 1, or, is within a defined intensity slope between two "saturated pixels".

Criteria 3—a cell is a "text" cell if a defined percentage of the pixels in the cell meet criteria 1.

Criteria 4—a cell is "text" cell if a defined percentage of pixels in the cell meet criteria 2.

The preferred text restoration function for this implementation is to apply a pixel saturation function to each pixel in a "text" cell such that each pixel is forced to the nearest saturated colour or the one of a set of defined colours.

Figure 15:
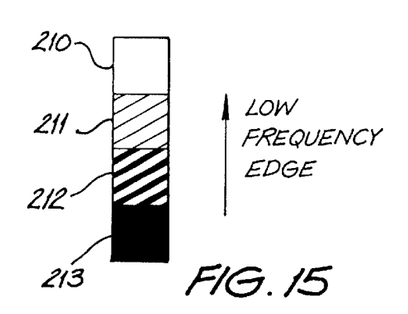
FIGS. 15 and 16 illustrate the difference between and low and high frequency edge transitions.
Figure 16:
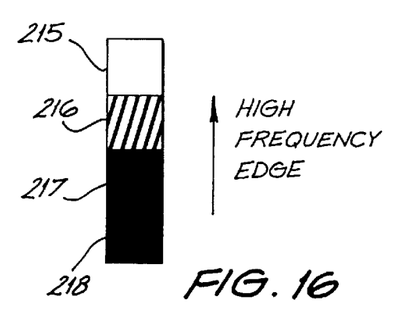

In relation to criteria 2, FIGS. 15 and 16 show different intensities of slope between two "saturated" pixels. In FIG. 15, a low frequency edge transition is shown between a white pixel 210, and a black pixel 213. Interspaced between the pixels 210 and 213 are two grey pixels, a light grey pixel 211, and a dark grey pixel 212. The defined intensity slope refers to the rate of change between the two saturated colours and whether or not that cell is identified as a "text" cell. In the example of FIG. 15, the low frequency edge can be deemed to be below a slope threshold, and therefore the cell comprising the pixels 210–213 is deemed a non-text or an "image" cell.

However, in FIG. 16 a high frequency edge is formed where a grey pixel 216 separates a black pixel 217 and a white pixel 215. In this manner, the rate of change of colour is substantial, and essentially twice the rate as that of FIG. 15. Therefore the cell comprising the pixels 215—218 can be deemed a "text" cell.

With reference to criteria 3, where, for example, in a black and white system, a continuous tone grey scale of pixels is available, only those levels at either end of the scale represent actual black and actual white. Where, for example, 8 bit data is used, this means that only those cells which include pixels having levels 0 and 255 are deemed to be "text" cells. Because adjacent pixel levels (for example 1 and 254) are essentially the same in colour to the actual saturated colours, it is possible to also refer to these different levels as being saturated levels. In this manner, it is possible to select a certain percentage of pixel levels so as to meet the saturation criteria. For example, if the defined percentage is 2%, it is only necessary to look at the most significant 7 bits of the pixel data to determine if the pixel is saturated, and thereby the cell detected as a "text" cell. When restoring pixels in "text" cells, it is only necessary to inspect the most significant bit to determine if the pixel is to be saturated to black or white.

Although the foregoing examples refer only to black and white images, the same can be said for colour images which can be processed in either a colour mode, or a black and white mode. In the colour mode, it need only be necessary to examine the most significant bit of each of red, green and blue, to accord with the above. Alternatively, with a colour system operating in a black and white mode, because green contains most of the luminance of the image, it is only necessary to examine the most significant bit of the green data.

For the colour system operating in a colour mode, where only the most significant bit of the RGB data is examined, a total eight alternatives of the resulting colour can be produced. Those resulting colours are red, green, blue, magenta, cyan, yellow, black and white (the primary colours).

The configurations of FIGS. 1 and 2 can be combined through the interposition of a text controller between the compositing bus 16, and the compressor/expander 18, whilst also connecting to the system bus 12. An example of such is a text controller 80 shown schematically in FIGS. 3, 4 and 5. The text controller 80 is formed by three separate blocks comprising a text detector 82, a text restorer 84, and a TDRAM 86 having bank "A" 88, and a bank "B" 89. The compositing bus 16 of FIG. 1 connects to supply data to the text detector 82 and to receive data from the text restorer 84. The compressor/expander 18 interconnects to the text controller 80 via a bus connection 90 which receives data from the text detector 82, and supplies data to the text restorer 84. The TDRAM 86 interfaces the text detector 82 and text restorer 84 to the system bus 12 so that the text detect store 64 of FIG. 2 can be implemented within the RAM 14.

Figure 3:
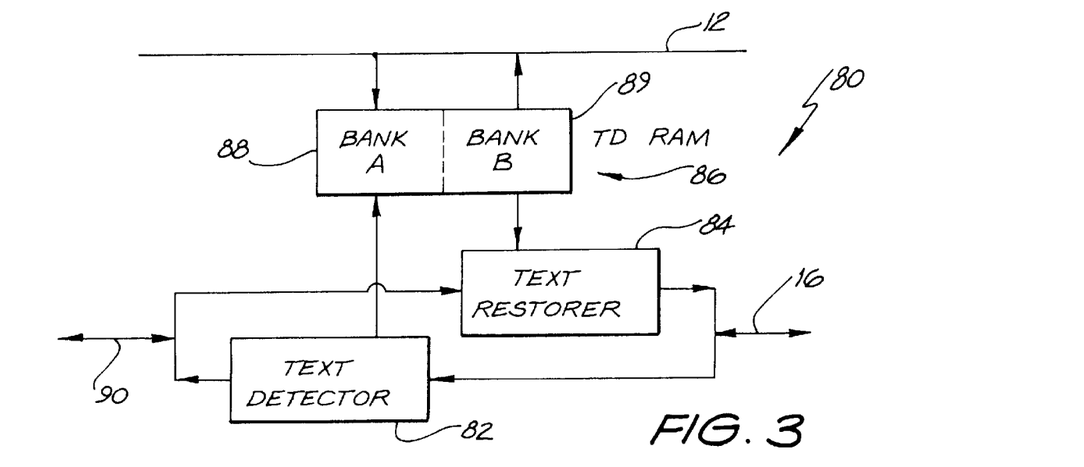
FIGS. 3, 4 and 5 are various views of a compression enhancement arrangement of another embodiment applicable to the graphics system of FIG. 1.
Figure 4:
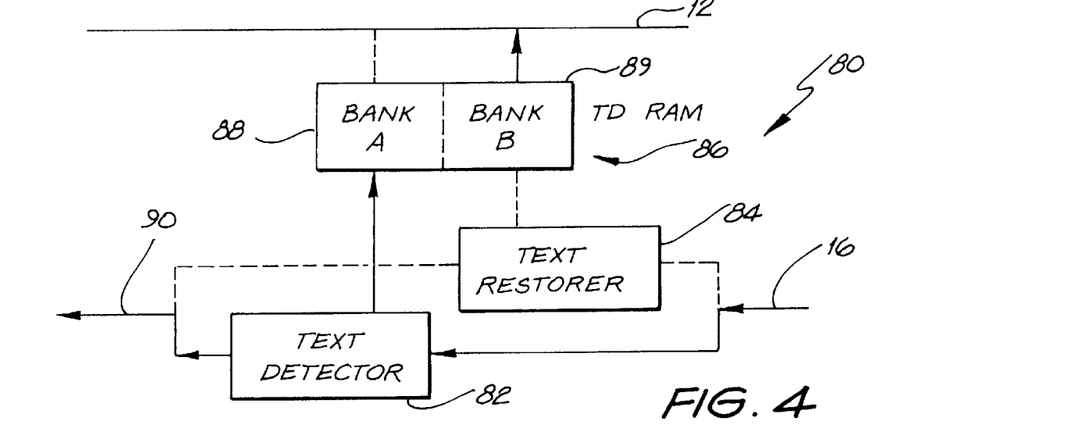
Figure 5:
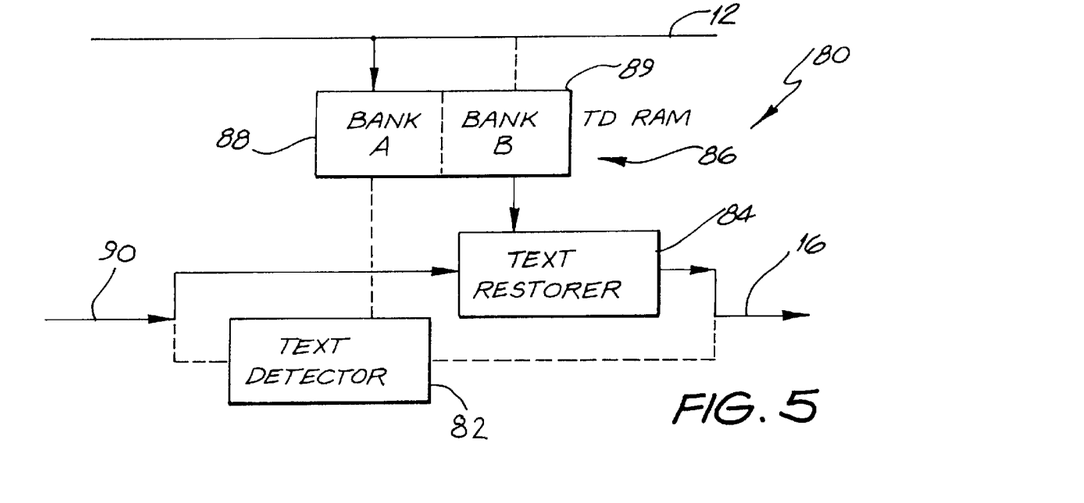

The text detector 82 is used when compressing an image from the compositing memory 17. During compression, image data is read from the compositing memory 17 and transferred to the JPEG compressor via the text detector 82. The text detector 82 examines the image as it passes through in order to determine whether a particular 8×8 pixel cell is actually "image" or "text". A cell is deemed to be a "text" cell if every pixel in that cell is a fully saturated colour. If each pixel in the cell is any one of yellow, cyan, magenta, red, green, blue, black or white, a "one" is written into the TDRAM 86 identifying that cell as a "text" cell. If any other colour is found, in any pixel location within the cell, a "zero" is written into the TDRAM 86. As each cell passes through the text detector 82, a map is built in the TDRAM 86 which specifies those parts of the image which are "text".

The TDRAM 86 is provided with two banks 88 and 89 because, in some configurations, it is possible to load one bank of the TDRAM at the same time as the other bank is being read. This allows consecutive portions of an image to be decompressed without having to wait for the TDRAM to be loaded. Similarly, consecutive portions of the image can be compressed without waiting for the TDRAM to be unloaded.

The text restorer 84 uses the map in the TDRAM 86 when an image is decompressed (expanded) from the JPEG expander, into the compositing memory 17. The JPEG compressor uses a "lossy" technique which degrades image quality to an extent which varies according to the compression factor and the image content. The degradation is particularly severe in areas which contain fast changes in luminance, such as areas of "text". The degradation is manifested in the form of white pixels becoming darker, and black pixels becoming lighter, and colours changes in hue and saturation. The text restorer 84, however, is able to determine which cells should be fully white, or black, or a saturated colour, since the data in the TDRAM 86 was generated before the degradation. The text restorer 84 simply saturates all pixels in "text" cells, and all "image" cell pixels are passed through unchanged. Using this method, the text restorer 84 returns all pixels in a "text" cell to their original fully saturated colours.

The foregoing technique does not reduce text degradation where the text is on a non-saturated background, or for scanned-in text. Generally, in the case of scanned-in text, the degradation is usually minimal as the spatial change in luminance is relatively slow. The compression factor also affects the ability of the text controller 80 to faithfully restore text regions. If the compression factor is excessively high, the text restorer 84 may saturate a pixel to the incorrect colour, as pixel degradation may exceed 50%.

The separation of the TDRAM into the banks 88 and 89 allows one bank to be used for input, while the other is used for output. During compression, the text detect data for one strip is written into bank A 88, while the text detect data for the previous strip is being transferred to the RAM 14 via the system bus 12. Bank A 88 and bank B 89 swap after every strip (8 lines of pixels corresponding to the size of the compositing memory 17). Similarly, during expansion, the text restorer 84 reads text detect data from bank A, while the data for the next cell row is being written into the bank B via the system bus 12.

FIG. 4 shows the data flow paths for the text controller 80 when operating for the compression of image data.

FIG. 5 shows the various data paths for the text controller 80 when expanding data onto the compositing bus 16.

The preferred embodiment can now be described with reference to FIGS. 6 to 11 in which a text detect/restore unit 100, seen in FIG. 6, connects to the TDRAM 86 of FIGS. 3 to 5. The unit 100 also makes other 20 connections corresponding to those of FIGS. 3 to 5 but more specifically identified in FIGS. 6 to 11.

Figure 6:
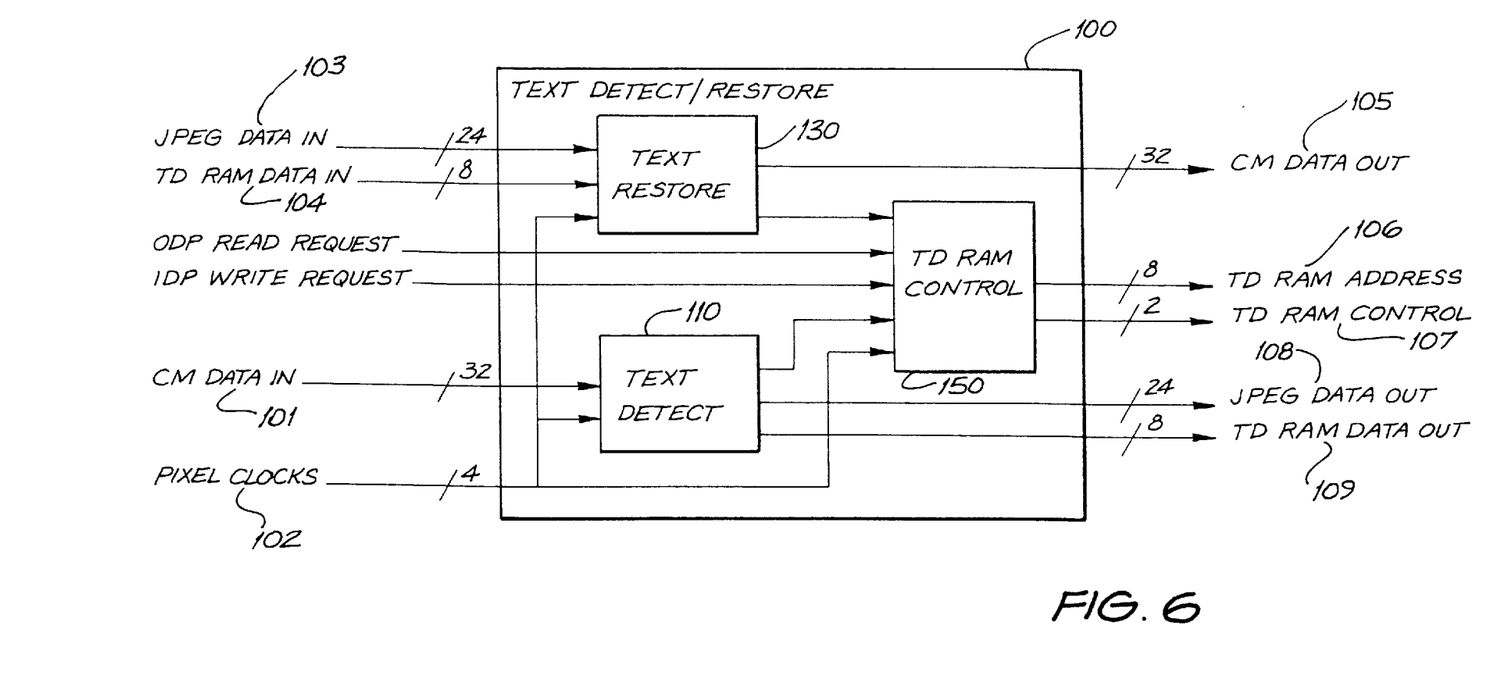
FIG. 6 is a schematic block diagram representation of a text detect/restore unit of the preferred embodiment.

Turning now to FIG. 6, the text detect/restore unit 100 includes a text detect unit 110, a text restore unit 130 and a TDRAM controller 150. During compression operations, the text detect unit 110 receives data from a compositing memory (CM) data input 101 and produces text detect data 109 which is written into the TDRAM 86. The CM data 101 is also passed straight through to the JPEG compressor via a JPEG data output 108. During expansion operations, the text restore unit 130 receives data 103 from the JPEG expander as well as text detection (TD) data 104 from the TDRAM 86, and produces restored data output as CM data output 105. The TDRAM controller 150 provides data timing, and addresses for each of the circuit blocks that use the TDRAM 86. The controller 150 accepts read byte requests from the text restore unit 130, write byte requests from the text detect unit 110, and read and write requests from the system bus 12.

Figure 7:
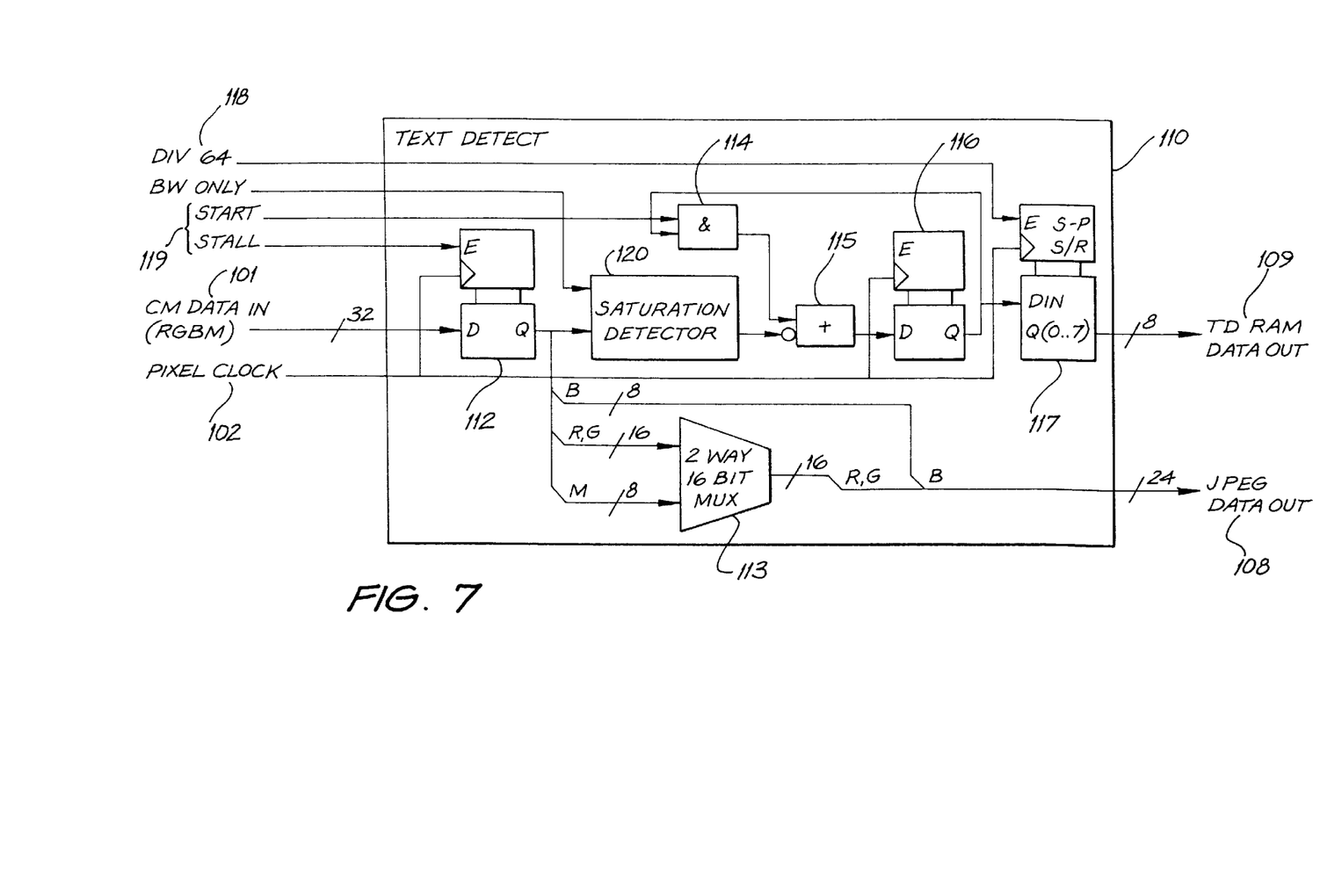
FIG. 7 is a schematic block diagram of the text detect unit of FIG. 6.

Turning now to FIG. 7, the text detect unit 110 is shown in which the CM data input 101 is latched via a series of D flip-flops 112 into a saturation detector 120, and, utilising a multiplexer 113, whose output is JPEG data out 108, is then passed to the JPEG compressor. The multiplexer 113 on the JPEG data path is required only the compression of the single component of the matte plane which requires an additional compression pass to that of RGB data.

The output of the saturation detector 120 is asserted if the RGB data represents one of the eight primary colours (including black and white). A BW_ONLY input 111 selects an optional "black and white only" mode. A flip-flop 116 is provided after the saturation detector 120, and is reset at the start of every JPEG cell of 64 pixels by AND gate 114, and is set if any of the pixels in the JPEG cell are not saturated, whereupon OR gate 115 holds this state until the end of the cell. At the end of the cell, the state of the flip-flop 116 is clocked into an 8-bit shift register 117 which holds the status of the last eight blocks. Every eight blocks the contents of the shift register 117 are written into the TDRAM 86, via the output 109.

Figure 8:
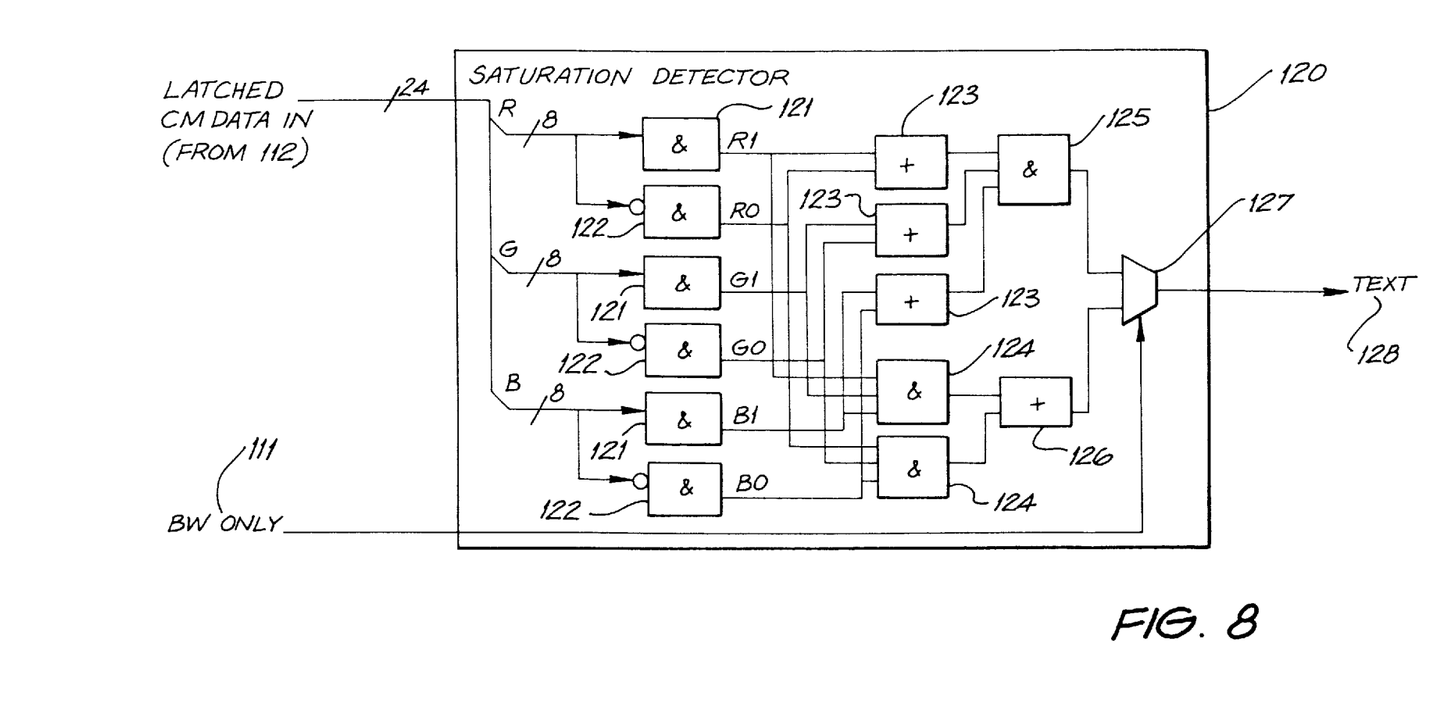
FIG. 8 is a schematic block diagram of the saturation detector of FIG. 7.

The saturation detector 120 as seen in FIG. 8, uses two 8 input AND gates 121 and 122 on each of the red, green and blue components. The AND gates 121 detect a value of 255 and the gates 122 detect a value of zero. In normal mode, the RGB colour is deemed saturated if each component is either 0 or 255. In black and white only mode, the RGB colour is deemed saturated if all three components are 0 (black), or if all three components are 255 (white). Three OR gates 123 and an AND gate 125 perform the necessary logic functions for the normal mode. Two AND gates 124 and an OR gate 126 perform the necessary logic functions for the black and white only mode. A multiplexer 127, arranged to provide text output 128, switches between the two modes based upon the BW_ONLY input 111.

Figure 9:
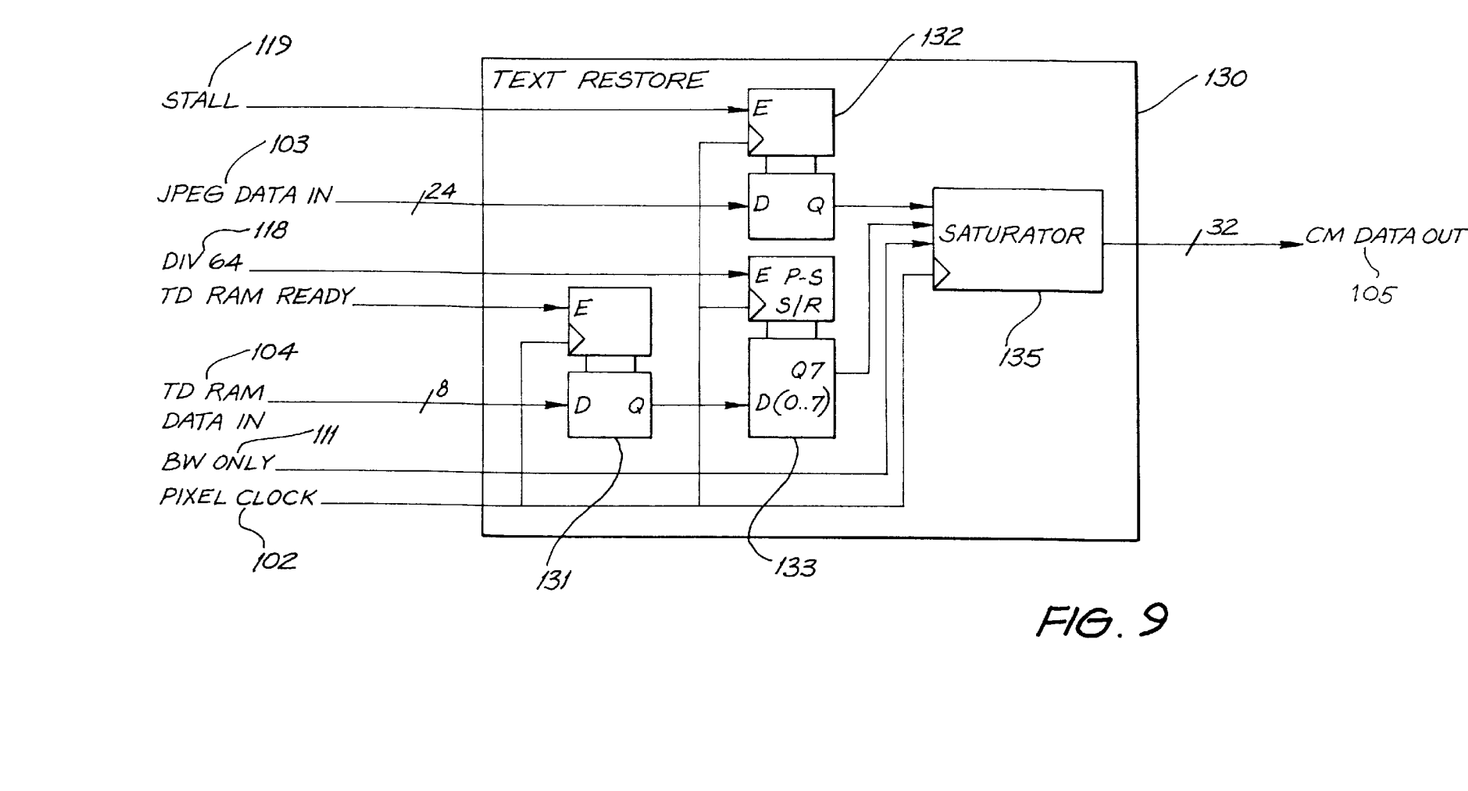
FIG. 9 is a schematic block diagram representation of the text restore unit of FIG. 6.

FIG. 9 shows the arrangement of the text restore unit 130 which is input with JPEG data 103 from the JPEG expander. The data 103 is latched through a flip-flop 132 and passed to a saturator 135. At the same time, TD data 104 for the next eight blocks are latched using a flip-flop 131 from the TDRAM 86 and subsequently loaded into a shift register 133. After every eight pixels, a new bit from the shift register 133 is presented to the saturator 135, specifying whether the current cell should be saturated, or passed straight through. The BW_ONLY signal 111 selects an optional black and white only mode. The same TD data 104 is read for each of the eight lines within a JPEG cell.

Figure 10:
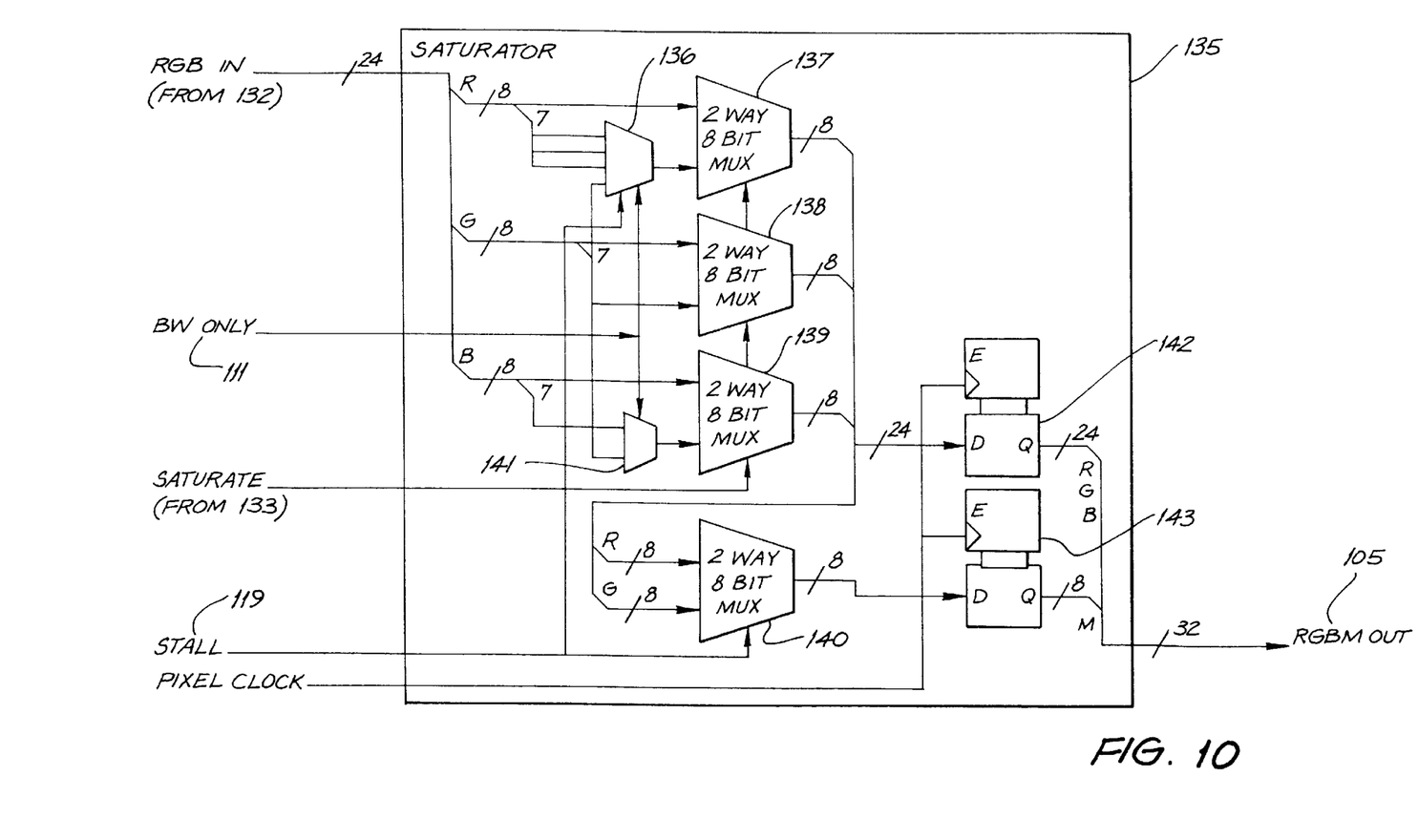
FIG. 10 is a schematic block diagram representation of the saturator of FIG. 9.

Turning now to FIG. 10, the configuration of the saturator 135 is shown. RGB data from the flip-flop 132 is input to three primary multiplexers 137, 138 and 139, one for each red, green and blue. The multiplexers 137–139 output to a latch 142 which supplies the output 105 onto the compositing bus 16. A further multiplexer 140 is provided for single component decompression of the matte plane which can be derived from the red and green data. In single component mode, the JPEG expander decompresses two matte components in each pixel clock period. For this reason, the JPEG expander is suspended every second pixel, by a stall signal 119. During even pixels, the matte component is extracted from the red data path, and from the green data path during odd pixels. A multiplexer 136, enabling black and white only mode and arranged in the red data path, is effectively disabled during single component expansion to ensure that odd and even pixels are treated separately.

The black and white only mode signal 111 also connects to a multiplexer 141 on the blue component and this, together with the multiplexer 136 acts to connect both the red and blue components to the green component when black and white only mode is asserted. In this case, only the green component is used when deciding whether to saturate to back or white.

For "image" cells, the RGB image data is passed straight through the multiplexers 137, 138, 139 and latched 142. For "text" cells, the output of each RGB component depends on whether the saturator 135 is set for normal mode or black and white only mode.

For "text" cells in normal mode, each RGB component is forced to either 0 or 255, depending on whether the most significant bit of that component is a 0 or a 1. In other words, if the input data is over 127, the output is set to its maximum, otherwise it is set to its minimum. Since each component is treated separately, the RGB output will be forced to one of the eight primary colours.

For "text" cells in black and white only mode, all three RGB components are forced to either 0 or 255, depending on whether the most significant bit of the green component is a 0 or a 1. In other words, if the green component is over 127, the output is set to white, otherwise it is set to black. The green component is used because most luma is encoded on green.

Figure 11:
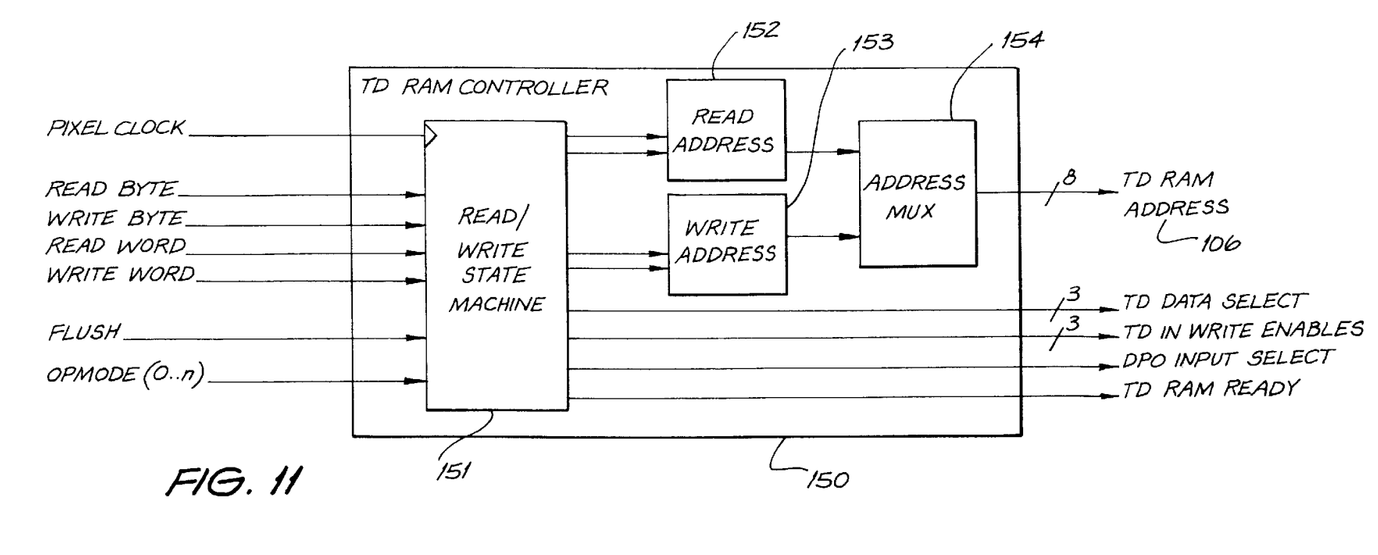
FIG. 11 is a schematic block diagram representation of the TDRAM controller of FIG. 6.

FIG. 11 shows the various components of the TDRAM controller 150. These comprise a read/write state machine 151, a read/address counters 152, write address counters 153, and an address multiplexer 154.

Depending on the mode of operation, the TDRAM controller 150 receives either a write 32-bit word request from the system bus 12, and a read byte request from the text store unit 130, or, a write byte request from the text detect unit 110 and a read 32-bit word request from the system bus 12. For both types of operations, the separate read and write address counters 152 and 153 are maintained.

The state machine 151 arbitrates between the requests, and controls the multiplexer 154. A FLUSH input onto the state machine 151 is asserted at the end of the last line in a cell, to ensure any incomplete text detect bytes are written into the TDRAM 86.

The preferred embodiment always restores compression distortion artifacts resulting from "text", rendered in one of the eight primary colours. However, when printing text of a colour not being one of the eight primary colours, then it is possible to obtain compression artifacts or speckles formed of any of the eight major colours because of the inability to sense the saturation of the printed colour. However, situations where this arise are expected to be few and the resolution of the eye is unlikely to detect any significant difference. The enhancements provided by the arrangements described in the foregoing are especially important when forming images in black and white, such as with text, where the contrast is greatest.

Figure 17:
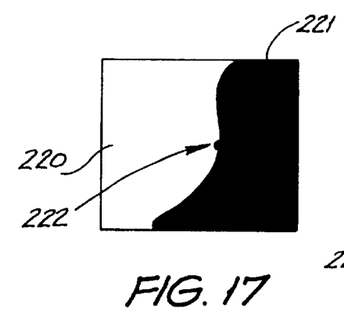
FIG. 17 illustrates how a bump can be formed on a black and white image.
Figure 18:
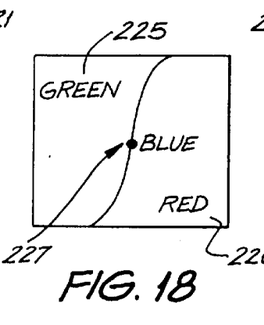
FIG. 18 illustrates how a new colour can be produced at an edge transition between two other different colours.

As seen in FIG. 17, when operating in black and white only mode, the threshold for saturation is exceeded by one value, this can give rise to a bump 222 of black displaced from a line bordering a white area 220 and a black 221. When operating the same in principle in colour mode, and a transition between a green section 225 and a red section 226 as seen in FIG. 18, a blue speckle 227 can be formed on the transition. This result can be detectable and so as to avoid this occurring, it is best to deem such a cell as a normal image cell and tolerate the various speckles that may result.

Figure 19:
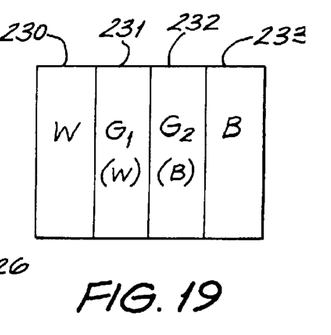
FIG. 19 illustrates a rate of change selection criteria.

As seen in FIG. 19, where a change in pixel colour from white 230, to light grey 231, to dark grey 232 and to black 233, is detected, this slope can be corrected by forcing the grey pixels 231, 232 to the colour of the nearest saturated colour. In this case pixel 231 is corrected to white and pixel 233 is corrected as black.

The foregoing describes only a number of embodiments of the present invention, and modifications, obvious to those skilled in the art, can be made thereto without departing from the scope of the present invention.

For example, the foregoing is not specifically limited to compression techniques utilising the JPEG standard, but to any compression technique which results in compression artifacts.

What is claimed is:

1. A method of removing compression artifacts in graphics systems, said method comprising the steps of:
    (a) examining an image comprising high frequency regions and low frequency regions to identify said high frequency regions at which compression artifacts are likely to be produced, deeming those regions as selected regions, and storing information regarding said selected regions;
    (b) lossy compressing the image, including the selected regions, to thereby produce compression artifacts, and subsequently expanding the compressed image;
    (c) identifying the expanded selected regions by way of said stored information; and
    (d) manipulating the expanded selected regions to reduce the visual impact of said produced compression artifacts by resetting the colour of a pixel, for each pixel within the expanded selected regions, to a colour of a first predetermined set of colors closest to the previous colour of the pixel.

2. A method as claimed in claim 1, wherein the selected regions comprise image pixels that are correctable.

3. A method as claimed in claim 2, wherein step (a) comprises the steps of identifying from the image those regions that include a predetermined proportion of pixels that are represented by a second predetermined set of colours, and a pixel transition between any two colours of said set, and deeming same as a selected region.

4. A method as claimed in claim 3, wherein the second predetermined set of colours comprises black and white.

5. A method as claimed in claim 3, wherein the second predetermined set of colours comprises red, green, blue, yellow, cyan, magenta, black and white.

6. A method as claimed in claim 3, wherein the predetermined proportion is greater than 50%.

7. A method as claimed in claim 3, wherein a predetermined rate of change between said two colours is required in order to determine a selected region.

8. A method as claimed in claim 4 wherein the predetermined proportion is 100%.

9. A method as claimed in claim 2, wherein step (a) comprises the steps of identifying from the image those regions that include a predetermined proportion of pixels that are represented by a second predetermined set of colours, and deeming same as said selected regions.

10. A method as claimed in claim 9, wherein the second predetermined set of colours comprises black and white.

11. A method as claimed in claim 9, wherein the second predetermined set of colours comprises red, green, blue, yellow, cyan, magenta, black and white.

12. A method as claimed in claim 9, wherein the predetermined proportion is greater than 50%.

13. A method as claimed in claim 2, wherein step (a) comprises the step of identifying from the image those regions that include a pixel transition between any two colours of a second predetermined set of colours, and deeming same as selected region.

14. A method as claimed in claim 13, wherein the second predetermined set of colours comprises black and white.

15. A method as claimed in claim 13, wherein the second predetermined set of colours comprises red, green, blue, yellow, cyan, magenta, black and white.

16. A method as claimed in claim 13, wherein a predetermined rate of change between said two colors is required in order to determine a selected region.

17. A method as claimed in claim 16, wherein the rate of change is such that the separation between said two colours is one pixel.

18. A method as claimed in claim 1, wherein the first predetermined set of colours comprises black and white.

19. A method as claimed in claim 1, wherein the first predetermined set of colours comprises red, blue, green, magenta, cyan, yellow, black and white.

20. A compression enhancement arrangement for graphics systems, said arrangement comprising:
   detecting means for detecting high frequency regions of an image, comprising said high frequency regions and low frequency regions, in which compression artifacts are likely to be produced and deeming those regions as selected regions;
   storage means for maintaining a record of said selected regions; and
   restoring means for, after lossy compression of said image and subsequent expansion of said compressed image, manipulating the expanded selected regions based on said record to reduce the visual impact of any produced compression artifacts by resetting the colour of a pixel, for each pixel within the expanded selected regions, to a colour of a first predetermined set of colours closest to the previous colour of the pixel.

21. An arrangement as claimed in claim 20, wherein said detecting means comprises means for identifying regions that comprise image pixels that are correctable.

22. An arrangement as claimed in claim 21, wherein said detecting means comprises means for identifying those regions that include a predetermined proportion of pixels that are represented by a second predetermined set of colours.

23. An arrangement as claimed in claim 21, wherein said detecting means comprises means for identifying those regions that include a pixel transition between any two colours of the second predetermined set of colours.

24. An arrangement as claimed in claim 21, wherein said detecting means comprises means for identifying those regions that include a predetermined proportion of pixels that are represented by a second predetermined set of colours, and means for identifying those regions that include a pixel transition between any two colours of said set.

25. An arrangement as claimed in claim 22, wherein the second predetermined set of colours comprises black and white.

26. An arrangement as claimed in claim 22, wherein the second predetermined set of colours comprises red, green, blue, cyan, magenta, yellow, black and white.

27. An arrangement as claimed in claim 22, wherein said predetermined proportion is greater than 50%.

28. An arrangement as claimed in claim 23, wherein the second predetermined set of colours comprises black and white.

29. An arrangement as claimed in claim 23, wherein the second predetermined set of colours comprises red, green, blue, cyan, magenta, yellow, black and white.

30. An arrangement as claimed in claim 23, wherein a predetermined rate of change between said two colours is required to determine a selected region.

31. An arrangement as claimed in claim 30, wherein the rate of change is such that the separation between said two colours is one pixel.

32. An arrangement as claimed in claim 24, wherein the second predetermined set of colours comprises black and white.

33. An arrangement as claimed in claim 24, wherein the second predetermined set of colours comprises red, green, blue, cyan, magenta, yellow, black and white.

34. An arrangement as claimed in claim 24, wherein said predetermined proportion is greater than 50%.

35. An arrangement as claimed in claim 24, wherein a predetermined rate of change between said two colours is required to determine a selected region.

36. An arrangement as claimed in claim 32, wherein said predetermined proportion is 100%.

37. An arrangement as claimed in claim 20, wherein said storage means comprises a memory configured to retain a bit map of the image divided into said regions that identifies said selected regions.

38. An arrangement as claimed in claim 20, wherein said restoring means comprises a saturator for fully saturating each pixel within the expanded selected regions.

39. An arrangement as claimed in claim 20, wherein said first predetermined set of colours comprises black and white.

40. An arrangement as claimed in claim 20, wherein said first predetermined set of colours comprises red, green, blue, cyan, magenta, yellow, black and white.

41. An arrangement as claimed in claim 20, wherein said first predetermined set of colours can be switched between two different sets to provide a colour mode, and a black and white mode.

42. An arrangement as claimed in claim 41, wherein said colour mode is based upon red, green and blue colour data.

43. An arrangement as claimed in claim 41, wherein said black and white mode is based upon green colour data only.

44. A graphics system including:
   compressor/expander means for lossy compressing image data, comprising high frequency regions and low frequency regions, and for expanding compressed image data, wherein said compressor/expander means permits the storage of compressed image data; and
   a compression enhancement arrangement coupled to said compressor/expander means, said arrangement comprising:
      detecting means for detecting said high frequency regions of image data in which compression artifacts are likely to be produced and deeming those regions as selected regions;
      storage mans for, after lossy compression of said image data and subsequent expansion of said compressed image data, manipulating the expanded selected regions based on said record to reduce the visual impact of any produced compression artifacts by resetting the colour of a pixel, for each pixel within the expanded selected regions, to a colour of a first predetermined set of colours closest to the previous colour of the pixel.

45. A graphics system as claimed in claim 44, wherein said compression enhancement arrangement interconnects between an image store and said compressor/expander means, and said storage means is formed in a primary memory of said graphics system.

46. A graphics system as claimed in claim 45, wherein compressed image data is also stored in said primary memory along with said record.

47. A graphics system as claimed in claim 45, wherein said image store is a full frame store.

48. A graphics system as claimed in claim 45, wherein said image store is of limited capacity sufficient to store only a portion of said image data.

49. A graphics system comprising:
   a host processor for generating and instructing manipulations of image data comprising high frequency regions and low frequency regions;
   compression and expansion means interconnected with a main storage means for lossy compressing said image data prior to storage in said main storage means and for expanding said compressed image data upon retrieval from said main storage means;

a compression enhancement arrangement comprising:

detecting means for detecting said high frequency regions of said image data in which compression artifacts are likely to be produced and for deeming said regions as selected regions;

record means for maintaining a record of said selected regions;

restoring means for, after compression and subsequent expansion of said image data, manipulating the expanded selected regions based on said record to reduce the visual impact of any produced compression artifacts by resetting the colour of a pixel, for each pixel within the expanded selected regions, to a colour of a first predetermined set of colours closest to the previous colour of the pixel; and display means for displaying said image data.

50. A graphics system as claimed in claim 49, wherein said display means comprises a printer.

51. A graphics system as claimed in claim 49 wherein said display means comprises a video display unit.

52. A graphics system as claimed in claim 49 further comprising an input means for inputting pixel-based image data.

53. A graphics system as claimed in claim 52 wherein said input means comprises a scanner.

54. A graphics system as claimed in claim 49, further comprising a memory connected to said compression and expansion means in which portions of said image data are manipulated after retrieval from said main storage means, and graphics engine means connected between said memory and said host processor for implementing pixel-based image manipulations on said portions.

* * * * *

UNITED STATES PATENT AND TRADEMARK OFFICE
CERTIFICATE OF CORRECTION

PATENT NO. : 5,845,010
DATED : December 1, 1998
INVENTOR(S) : KIA SILVERBROOK ET AL.

It is certified that error appears in the above-identified patent and that said Letters Patent is hereby corrected as shown below:

COLUMN 1 line 25, "that" should read --than--; and
   line 50, "Phenomena" should read --phenomenon--;

COLUMN 7 line 67, "only the" should read --only for the--.

COLUMN 9 line 16, "luma" should read --image data--; and
   line 41, "arise" should read --arises--.

COLUMN 10 line 41, "claim 4" should read --claim 4,--; and
   line 59, "as" should read --as a--.

COLUMN 12 line 39, "mans" should read --means--.

UNITED STATES PATENT AND TRADEMARK OFFICE
CERTIFICATE OF CORRECTION

PATENT NO. : 5,845,010
DATED : December 1, 1998
INVENTOR(S) : KIA SILVERBROOK ET AL.

It is certified that error appears in the above-identified patent and that said Letters Patent is hereby corrected as shown below:

COLUMN 14

```
line 3,    "claim 49" should read --claim 49,--;
line 5,    "claim 49" should read --claim 49,--; and
line 8,    "claim 52" should read --claim 52,--.
```

Signed and Sealed this

Twenty-fourth Day of August, 1999

Attest:

Q. TODD DICKINSON

*Attesting Officer*  *Acting Commissioner of Patents and Trademarks*